Feb. 21, 1967
E. M. HEATON
3,304,818
PIVOTED DUCT ASSEMBLY TOOL HAVING LATERALLY
EXTENDING PIVOTED JAWS
Filed June 11, 1965
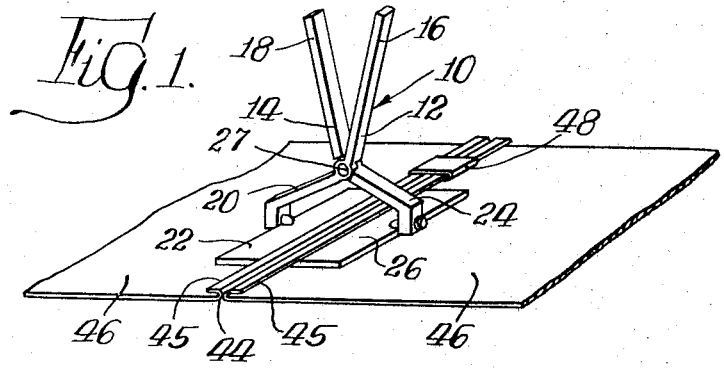
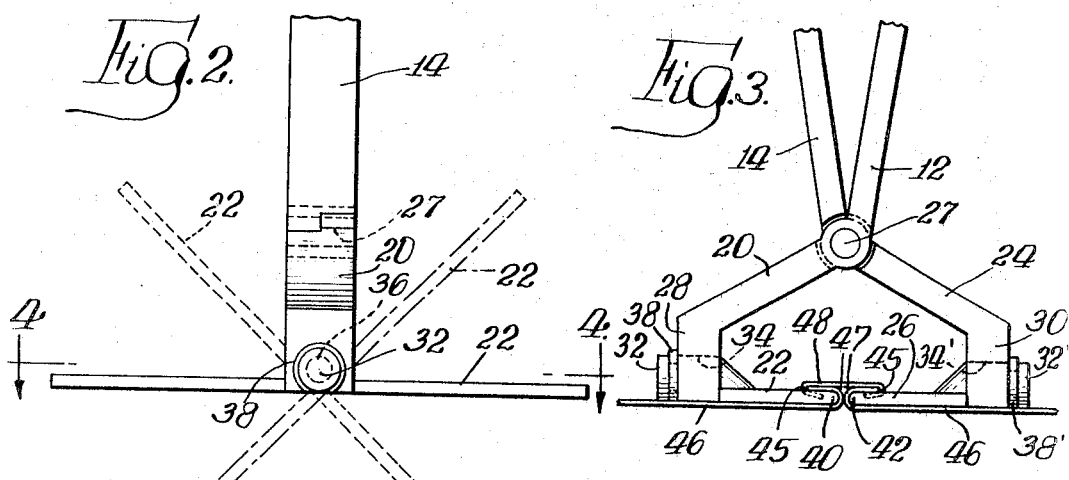
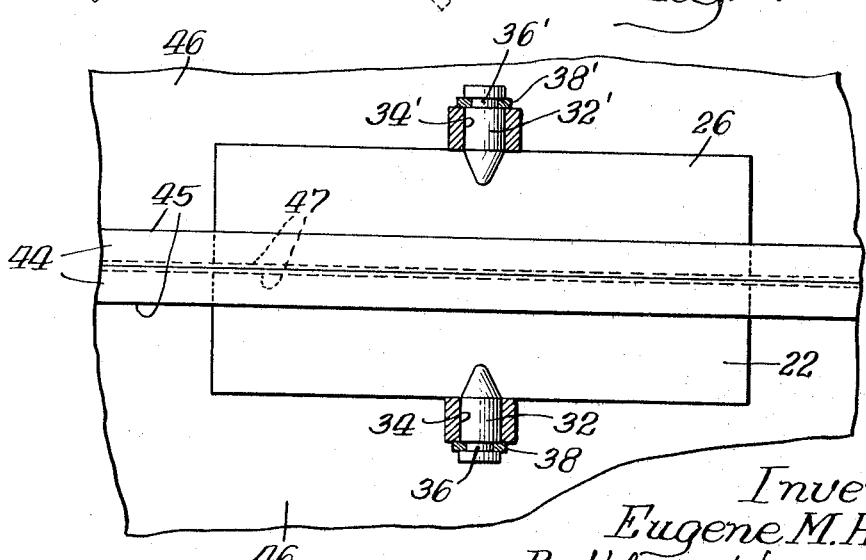
Inventor:—
Eugene M. Heaton,
By Hofgren, Wegner, Allen,
Stellman & McCord Attys

United States Patent Office 3,304,818
Patented Feb. 21, 1967

3,304,818
PIVOTED DUCT ASSEMBLY TOOL HAVING LATERALLY EXTENDING PIVOTED JAWS
Eugene M. Heaton, Round Lake, Ill., assignor of one-half to Thomas D. Ahern, Chicago, Ill.
Filed June 11, 1965, Ser. No. 463,228
2 Claims. (Cl. 81—5.1)

This invention relates to clamping tools for use in assembling duct work.

The forming of ducts of a plurality of duct sections is well known. Commonly, each duct section includes on the outer surface of each side at the ends thereof, a re-entrant, generally C-shaped flange. In assembling such duct sections to form a duct, the respective flanges on a pair of duct sections are brought into an abutting relation, and a generally C-shaped channel member is then passed about the flanges to provide a relatively air tight rigid connection between the two duct sections. Heretofore, difficulty has been more or less universally experienced in attempting to hold the flanges in abutting relation while the channel member is slipped onto the flanges from the end thereof. The task is generally unwieldy as there are no means available to positively grip the flanges and the means employed are often makeshift and slip off of the flanges prior to the placement of the channel member about the flanges. Oftentimes, in order to prevent such slippage, the workman installing the duct work manipulates whatever tool he is using in a manner to subject the flanges to an excessive amount of force which results in the flanges being distorted. Of course, such distorted flanges render the step of slipping the channel member about the flanges very difficult. Furthermore, when it is necessary for the workman installing the duct to work in close quarters, manipulation of any tool to maintain the duct sections in abutting relationship while sliding on the channel section, becomes increasingly difficult and compounds the problems involved.

It is, therefore, the principal object of the invention to provide a new and improved tool for use in the assembling of duct work, eliminating such difficulties encountered in the prior art.

More specifically, it is an object of the invention to provide a clamping tool for use in assembling duct work which provides a positive grip on the flanges of the duct sections.

Another object of the invention is the provision of a clamping tool for use in the assembling of duct work including a duct flange engaging portion having a relatively narrow edge that may be received within the C-shaped duct flange to contact and apply pressure against the bight thereof.

Yet another object of the invention is the provision of such a clamping tool wherein the duct engaging portions are of sufficient length such that the ends of the C-shaped duct flanges are not subjected to damaging and distorting contact with other portions of the tool.

Another object of the invention is the provision of such a tool wherein the duct engaging portions are elongated such that clamping pressure is applied to the duct flanges along a substantial portion of the length thereof to distribute the clamping pressure along the length of the duct flange to minimize the possibility of distortion thereof.

Another object of the invention is the provision of such a clamping tool wherein the duct engaging portions are blunt to preclude the tool from cutting into the duct flanges during the application of clamping pressure such that the duct is not weakened by use of the tool.

Yet another object of the invention is the provision of such a clamping tool wherein the duct engaging portions are pivotally mounted on the tool body such that the tool may be used in close quarters.

Other objects and advantages of the invention will be apparent from the following description taken in connection with the accompanying drawings, in which:

FIGURE 1 is a perspective view of a form of the invention being used in the assembly of a pair of duct sections;

FIGURE 2 is a side elevation showing the pivotal mounting of the duct engaging portions of the tool;

FIGURE 3 is another side elevation showing the tool applying clamping pressure to a pair of duct sections; and FIGURE 4 is a horizontal section taken approximately along the line 4—4 of FIGURE 2, and additionally including a fragmentary showing of a pair of duct sections.

An exemplary form of the invention, generally designated 10, is shown in FIGURE 1. The tool 10 includes a pair of elongated members 12 and 14 having handle portions 16 and 18, respectively, at the ends thereof. Elongated member 12 includes an angularly offset portion 20 to which is connected a duct flange engaging portion 22. Similarly, elongated member 14 includes an angularly offset portion 24 to which is connected a second duct flange engaging portion 26. The first and second elongated members 12 and 14 are connected intermediate their ends by a pivotal connection 27, which may be of conventional construction.

Each of the duct engaging portions 22 and 26 are secured to the elongated members 12 and 14 on second angularly offset portions 28 and 30 on the first angular offset portions 20 and 24, respectively. Preferably, these connections are made by pivots which facilitate the use of the clamping tool in close quarters in a manner to be seen hereinafter. As the duct flange engaging portions 22 and 26 and their connections to the second offset portions 28 and 30 are identical, the structure of only one of these elements will be described, it being understood that the other is constructed in the same manner.

The duct flange engaging the portion 22 has mounted on its side opposite the end of the second angularly offset portion 28, a cylindrical stub shaft 32. The stub shaft 32 is received in an aperture 34 in the second angularly offset portion 28 and projects therethrough to extend somewhat beyond the outermost side of the angularly offset portion 28. Adjacent the outermost end of the stub shaft 32 there is provided an annular groove 36 in which is received a locking ring 38. The groove 36 and the locking ring 38 are arranged with respect to the outermost side of the second angularly offset portion 28 such that the locking ring bears against the outermost side of the second angularly offset portion 28 to preclude movement of the stub shaft along its longitudinal axis relative to the aperture 34 while permitting the stub shaft 32 to rotate within the aperture 34. The corresponding structure associated with the duct flange engaging portion 26 is indicated as 32', 34', 36' and 38'.

As may be best seen in FIGURES 1 and 3, each of the duct flange engaging portions 22 and 26 are elongated such that engagement thereof with the duct flanges 44 will take place over a substantial portion of the length of the duct flange to distribute the clamping force along a substantial portion of the length of the duct flanges to preclude the tool from distorting the duct flanges when clamping pressure is applied. In an exemplary form of the invention, it has been found that a length of four inches is generally sufficient for this purpose. Additionally each of the duct flange engaging portions 22 and 26 are dimensioned such that their pressure applying sides 40 and 42, respectively, are sufficiently narrow, as for example, 3/32 of an inch, such that they may be freely entered into the re-entrant generally C-shaped duct flanges to engage the bights 47 thereof. As best seen in FIGURE 3, the sides 40 and 42 are made relatively blunt to preclude a cutting action on the duct flanges 44 when clamping pressure is applied to preclude the weakening of the duct flanges at such points. In order to insure the preclusion of such undesirable cutting action, the sides 40 and 42 are preferably rounded. It is also desirable that the length of the duct engaging portions 22 and 26 between their edges 40 and 42 and the second angularly offset portions 28 and 30 be sufficiently great so as to preclude contact between the second angularly offset portions 28 and 30 and the ends 45 of the duct flanges which could possibly distort the latter such that the channel member 48 securing the two duct sections 46 together cannot readily be placed about the flanges. In an exemplary form of the invention, a length of ¾ of an inch has proved to be sufficient for this purpose.

To use the clamping tool 10, it is only necessary to bring the two duct sections 46 reasonably close to each other such that the duct engaging portions 22 and 26 may be at least partially inserted in the C-shaped flanges 44 thereon. The handles 16 and 18 are grasped in a single hand and drawn together to force the duct flange engaging portions 22 and 26 together and thus the two duct sections 46 together. When the two duct sections 46 have achieved an abutting relationship, pressure is maintained on the handles 16 and 18 with one hand while the channel member 48 may be easily slid about the duct flanges 44 with the other hand. In the event that the assembly of the duct sections 46 must take place in close quarters and there is not sufficient room for the handles to be disposed generally transverse to the duct engaging portions 22 and 26, the handles 16 and 18 may be rotated relative to the duct engaging portions 22 and 26 about the pivots provided by the stub shafts 32 and 32' and the apertures 34 and 34'. By this construction, the space necessary for use of the tool is effectively minimized.

Having described a specific embodiment of my invention as required by 35 U.S.C. 112, I do not wish to be limited to the construction set forth, but rather, to have my invention construed broadly according to the true spirit thereof as set forth in the following claims.

I claim:

1. A clamping tool for use in assembling duct work wherein duct sections including re-entrant generally C-shaped flanges have their respective flanges brought into abutment to receive generally C-shaped channel members to hold the flanges in such an abutting relation to form a duct comprised of a plurality of duct sections, said clamping tool comprising, in combination: a first elongated member having a handle portion at one end and a duct flange engaging portion at the other end thereof; a second elongated member having a handle portion at one end and a duct flange engaging portion at the other end thereof; means pivotally interconnecting said first and second members at a point intermediate their ends for movement of said duct flange engaging portions toward and away from each other in response to manual manipulation of said handle portions; each of said duct flange engaging portions comprising a member having a first relatively narrow rounded side of a width of sufficiently small size so as to be freely enterable into a C-shaped duct flange, a second side of a length sufficient to allow said first side to contact the bight of a C-shaped duct flange while precluding contact between a duct flange and said elongated members, and a third elongated side of a length sufficient to allow said first side to contact a duct flange over a substantial portion of the length of the latter whereby clamping force exerted by said tool on duct flanges is distributed over a substantial portion of the length of the latter to preclude distortion thereof; and means pivotally connecting each said duct flange engaging portions to its respective one of said elongated members, each said connecting means comprising a stub shaft secured at one end to said duct flange engaging portion and having an annular groove at the other end thereof, said stub shaft being received in an aperture in its associated elongated member, and a locking ring disposed in said groove to preclude movement of the stub shaft within the aperture along the longitudinal axis of the stub shaft while permitting rotational movement of the duct flange engaging portion relative to its associated elongated member whereby said clamping tool may be used within a relatively small area.

2. A clamping tool for use in assembling duct work wherein duct sections including re-entrant generally C-shaped flanges have their respective flanges brought into abutment to receive generally C-shaped channel members to hold the flanges in such an abutting relation to form a duct comprised of a plurality of duct sections, said clamping tool comprising, in combination: a first elongated member having a handle portion at one end and a duct flange engaging portion at the other end thereof; a second elongated member having a handle portion at one end and a duct flange engaging portion at the other end thereof; means pivotally interconnecting said first and second members at a point intermediate their ends for movement of said duct flange engaging portions toward and away from each other in response to manual manipulation of said handle portions; each of said duct flange engaging portions comprising a member having a relatively narrow rounded side of a width of sufficiently small size so as to be freely enterable into a C-shaped duct flange; and means pivotally connecting each said duct flange engaging portions to its respective one of said elongated members, each said connecting means comprising a stub shaft secured at one end to said duct flange engaging portion and having an annular groove at the other end thereof, said stub shaft being received in an aperture in its associated elongated member, and a locking ring disposed in said groove to preclude movement of the stub shaft within the aperture along the longitudinal axis of the stub shaft while permitting rotational movement of the duct flange engaging portion relative to its associated elongated member whereby said clamping tool may be used within a relatively small area.

References Cited by the Examiner

UNITED STATES PATENTS

| | | | |
|---|---|---|---|
| 1,484,222 | 2/1924 | Kightlinger | 81—420 X |
| 2,247,780 | 7/1941 | Klammt | 81—420 X |
| 2,882,768 | 4/1959 | Nelson | 81—424 X |

WILLIAM FELDMAN, *Primary Examiner.*

MILTON S. MEHR, *Examiner.*